Dec. 27, 1938.   L. KÖSTERS   2,141,305
HYDRAULIC COUPLING
Filed Oct. 27, 1937
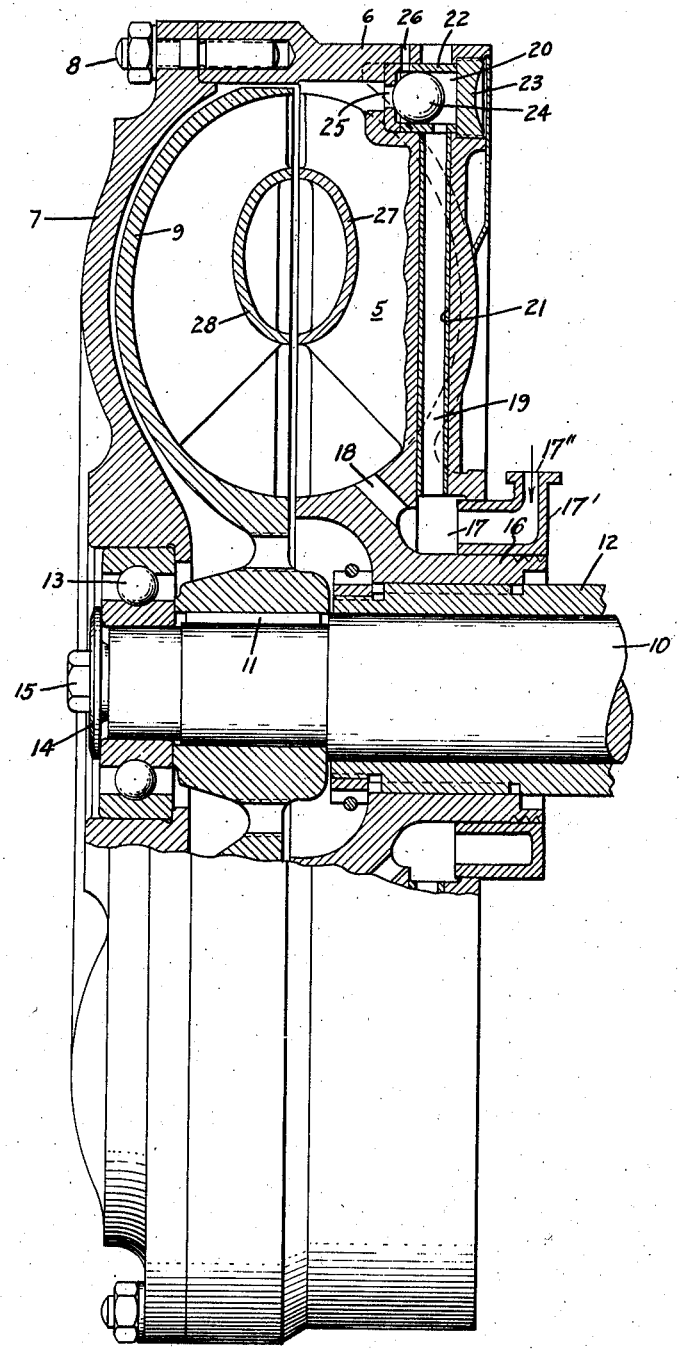
Inventor:
Ludwig Kösters,
by Harry E. Dunham
His Attorney.

Patented Dec. 27, 1938

2,141,305

UNITED STATES PATENT OFFICE 2,141,305

HYDRAULIC COUPLING

Ludwig Kösters, Berlin-Lichterfelde, Germany, assignor to General Electric Company, a corporation of New York Application October 27, 1937, Serial No. 171,299
In Germany November 19, 1936

3 Claims. (Cl. 60—54)

My invention relates to hydraulic couplings, or power transmitting devices, and more particularly to an improved means for regulating the volume of fluid in said devices.

One object of my invention is to provide a frictionless throttle valve for controlling the escape of fluid from the transmission device.

For a better understanding of my invention together with other and further objects thereof reference is had to the following description taken in connection with the accompanying drawing, and its scope will be pointed out in the appended claims.

My invention is especially adapted for use in the hydraulic couplings, or transmissions, known as the Föttinger transmissions, and disclosed in U. S. Patents 1,199,359 and 1,199,360 issued to Föttinger. In devices of this type, a regulation of the escape of fluid from the device is desirable to regulate the operation of the device. A convenient manner of regulating the fluid in these devices is to provide a spring, or a flexible diaphragm operated valve, which is responsive to both the pressure in the casing and to the pressure of the fluid supply. With this arrangement, the fluid in the device is held therein as long as the pressure of the admitted fluid is normal. When the fluid supply is either shut off or its pressure is sufficiently reduced, the pressure within the casing overcomes the pressure of the valve spring, or diaphragm tension, and the valve is opened to permit fluid to escape from the coupling.

My invention resides in the provision of an improved valve mechanism which is responsive to the fluid alone, and is not affected by the tension resistance of a diaphragm or by the pressure of a spring, whereby an accurate throttling action is obtained.

In the accompanying drawing, I have illustrated, partly in vertical cross section, taken through the center, a hydraulic transmission device of the type described in the above-mentioned Föttinger patents in which a series of pump vanes 5 is mounted on the wall of a rotatable casing 6, the end of which is closed by a cover member 7 held in place by suitable means such as bolts 8. A turbine wheel 9 is mounted in said closed casing, parallel to the pump vanes 5, on a driven shaft 10 to which it is keyed by a key 11. The shaft 10 projects into the casing 6 through a hollow shaft 12, only a fragment of which is shown, and beyond the turbine wheel 9 where it supports a frictionless bearing 13. The bearing 13 is the conventional type of ball bearing held in place on the shaft by a plate 14 and bolt 15 and provides for rotation of the cover end of the casing relatively to the shaft.

The hollow shaft 12, of which only a fragment is shown, comprises a second bearing for the casing and drives the casing 6 through a hub 16 which is keyed to it. In the hub 16, an annular chamber 17 is provided to which operating fluid is supplied through a stationary annulus 17' into which fluid flows through a flanged inlet 17" from a source not shown. The operating fluid reaching this annular chamber through the annulus 17' flows to the inside of the casing through a channel 18 and also flows through a radial channel 19 in the wall of the casing 6, into a valve chamber 20. The channel 19 is formed by a tube 21 and the valve chamber 20 is formed by a cup-shaped member 22 closed at one end by a cover 23. The valve chamber 20 comtains a ball 24 which is movable horizontally to one end of the valve chamber to close an opening 25 leading from the casing into the valve chamber and is movable from this opening to open the channel 25 and to simultaneously connect one end of the valve chamber 20 through a channel 26 to the outside of the casing. This ball 24 being arranged to move horizontally in the member 22 remains unaffected in this movement by centrifugal force generated by the rotation of the casing 6 and moves solely in response to the fluid pressure in the casing which is exerted upon one side of the ball through the opening 25 and in response to the pressure of the supply fluid reaching the other side of the ball in the valve chamber through the radial channel 19. When fluid is admitted to the casing through the channel 18 from the annular chamber 17, the pressure of the fluid exerted upon the back of the ball 24 through the channel 19 and chamber 20 moves the ball 24 toward the opening or channel 25 to regulate the escape of fluid from the casing. The ball 24 is free to move in the valve chamber and its movement is therefore solely due to an unbalance between the pressure of the fluid in the casing and the pressure of the fluid supply. When the casing fluid pressure overcomes the pressure of the fluid supply, the ball 24 moves away from the channel 25 and permits fluid to escape from the casing through channel 25 into the valve chamber and to the outside of the casing through channel 26. The size of these escape channels can, of course, be varied to suit the time requirements for emptying the casing. A sensitive throttling action is thereby obtained. The advantage of this throttling valve is its simplicity of construction, and its independence of any spring pressure or diaphragm tension.

In operation the casing 6 with the pump vanes 5 is rotated by the hollow driving shaft 12. When it is desired to transmit power to the turbine wheel 9 an operating fluid is forced from the annulus 17' to the annular chamber 17 through the channel 18 into the space between the pump and turbine vanes. This space is ring-shaped, being formed by the substantially circular walls of the casing and turbine wheel and by the spacing rings 27 and 28 which respectively space the outer ends of the pump and turbine vanes. As a result of the relative motion between the turbine and pump vanes the fluid is given a helical motion and, with the addition of a substantial centrifugal force, a pressure is built up in the casing tending to force the ball 24 away from the opening 25. This ball is held against the opening 25 by the supply fluid pressure exerted on the other side of the ball through the channel 19 and chamber 20. In actual operation a small amount of fluid escapes continuously and this amount increases as the casing fluid pressure exceeds the supply fluid pressure. A continuous throttling action is therefore present. When the supply fluid is completely shut off the fluid pressure in the chamber 20 is reduced by fluid leakage past the ball 24, through the clearance space which must necessarily be provided to permit the ball 24 to move freely in the chamber 20.

What I claim as new and desire to secure by Letters Patent of the United States is:

1. In a hydraulic coupling including a casing mounted for rotation, a pump wheel mounted in and attached to said casing and a turbine wheel mounted in said casing and spaced from said pump wheel for rotation relatively to said casing and said pump wheel, the combination of a supply chamber in said casing, a channel leading from said supply chamber to the space between said turbine and pump wheels, and a valve for regulating the escape of fluid flowing from the space between said wheels, said valve including a valve chamber, a connection from said casing to said valve chamber and to the outside of said casing, a spherical valve member loosely mounted in said valve chamber for moving horizontally independently of the centrifugal force created by the rotation of said casing for regulating the flow of fluid from said casing through said valve chamber to the outside of said casing, and a connection from said supply chamber to said valve chamber providing for supply fluid to urge said valve member to close the fluid escape channels in response to the pressure of said supply fluid whereby the escape of fluid from said casing is solely responsive to the difference in pressures between said casing and supply fluids.

2. In a hydraulic coupling the combination of a pump wheel, a turbine wheel, a casing enclosing said wheels and attached to one of said wheels for rotation therewith, a pair of concentric shafts attached to said wheels respectively, a fluid supply chamber in said casing connected to the space between said turbine and pump wheels, a valve chamber in the wall of said casing, a connection from said fluid supply chamber to said valve chamber, a connection from said casing to said valve chamber and a fluid escape connection from said valve chamber to the outside of said casing, and a ball in said valve chamber arranged to move horizontally subject to fluid pressure from said casing on one side and subject to pressure from said supply chamber on the other side thereof whereby the fluid escape from said casing is throttled in response to the difference between fluid pressure in said casing and said fluid supply chamber.

3. In a hydraulic power transmission the combination of a casing, a turbine wheel mounted in said casing, a shaft arranged concentric with said casing and projecting into said casing to support said turbine wheel, a pump wheel combined with said casing and arranged to rotate therewith, an annular chamber in the hub of said pump wheel, a channel connecting said annular chamber with said casing for the admission of an operating fluid into said casing from said annular chamber, and means for regulating the outlet of said fluid from said casing including a valve chamber, a connection between said casing and said valve chamber, a ball in said chamber, a radial channel between said valve chamber and said annular chamber for admitting fluid to said valve chamber to move said ball horizontally to close the channel between the valve chamber and said casing, and an opening from said valve chamber to the outside of said casing for permitting the fluid in said casing to escape when the pressure of the fluid in said casing overcomes the pressure of the fluid in said valve chamber.

LUDWIG KÖSTERS.